NIKOLAUS LAING
INGEBORG LAING
INVENTORS.

Feb. 15, 1966     I. LAING ETAL     3,234,921
ROTARY PISTON MACHINES

Filed Jan. 12, 1962                                     4 Sheets-Sheet 2

INGEBORG LAING
NIKOLAUS LAING
INVENTORS.

BY Western, Roos and Western

Feb. 15, 1966 I. LAING ETAL 3,234,921
ROTARY PISTON MACHINES
Filed Jan. 12, 1962 4 Sheets-Sheet 3
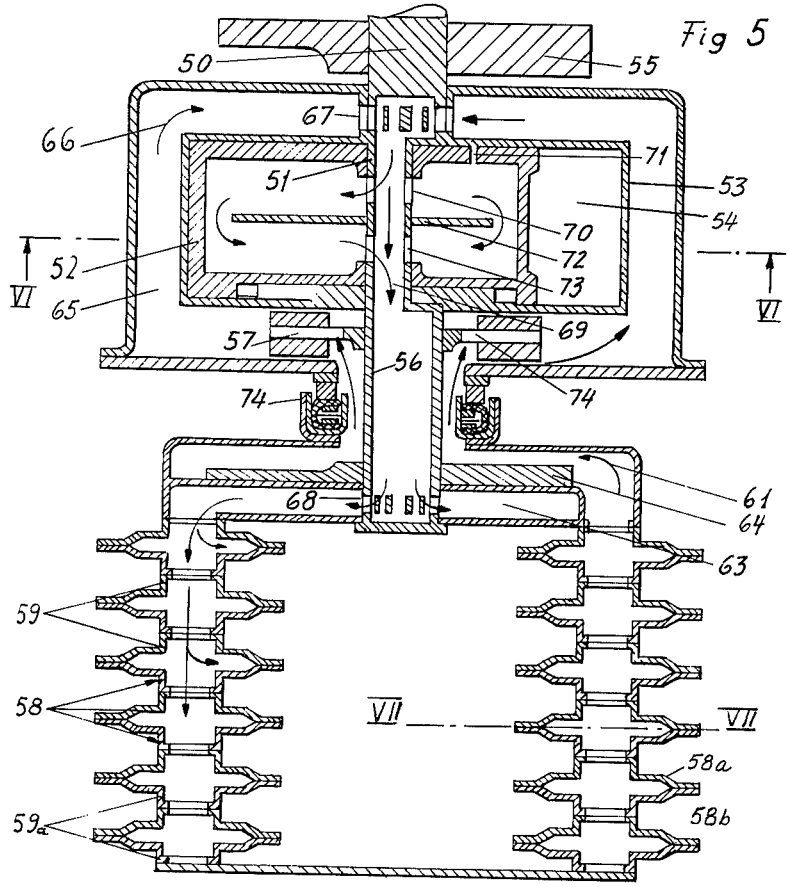
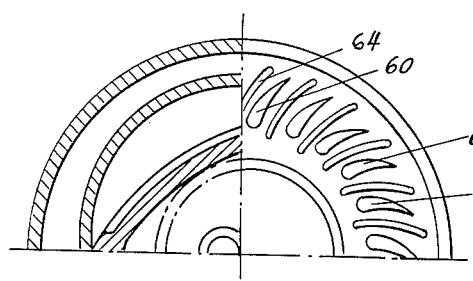
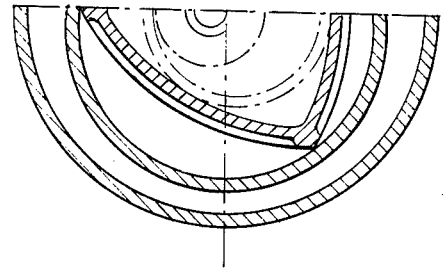
NIKOLAUS LAING
INGEBORG LAING
INVENTORS.
BY

NIKOLAUS LAING
INGEBORG LAING
INVENTORS.

BY Mestern, Ross & Mestern

United States Patent Office 3,234,921
Patented Feb. 15, 1966

3,234,921
ROTARY PISTON MACHINES
Ingeborg Laing, Rosenbergstrasse 24a, Stuttgart, Germany, and Nikolaus Laing, Stuttgart, Germany; said Nikolaus Laing assignor to said Ingeborg Laing
Filed Jan. 12, 1962, Ser. No. 165,737
Claims priority, application Germany, Jan. 13, 1961, L 37,944
5 Claims. (Cl. 123—8)

The present invention relates to rotary-piston machines, and more particularly to power plants including rotary-piston engines of the type wherein the pistons and/or cylinders are cooled internally by a fluid.

Rotary-piston engines of the type wherein the cylinder also rotates normally comprise hollow cylinders and hollow pistons. A stream of cooling liquid, normally water, is caused to pass through such hollow parts and the cooling liquid is also conducted through a heat exchanger which latter is arranged in a fixed position with reference to the rotating parts of the engine. While flowing through the heat exchanger, the liquid is cooled by a current of air.

It is an important object of the present invention to provide a power plant wherein the heat exchanger is operated by and forms with the rotary-piston engine a small and compact unit.

Briefly stated, the power plant of the present invention includes a rotary-piston engine comprising a cylinder and a piston therein, the cylinder and/or the piston having passages for the circulation of a cooling fluid and the engine being combined with a heat exchanger which is rigidly connected to a rotating part and is constructed to operate as the rotor of a fan. The heat exchanger comprises a series of profiled hollow fan blades which induce a flow of air thereover and are formed with ducts connected to the aforementioned passages so that the cooling fluid may circulate through such blades. The cooling fluid is preferably oil. The rotary-piston engine can be constructed as an internal combustion engine, a compressor or the like.

An important advantage of the improved power plant is that the large heat exchangers hitherto customary in such types of apparatus may be replaced by small axially symmetrical heat exchangers.

The heat exchanger which is utilized in the power plant of the present invention preferably resembles a cylinder so that it may be readily assembled with a rotary-piston engine. This is of considerable advantage because a rotary-piston engine normally comprises a cylindrical housing. Modern rotary-piston engines have the advantage of small overall size. According to the invention, the entire power plant including the heat exchanger may be constructed as a small and compact unit so that the invention allows this advantage of the rotary-piston engine to be fully exploited.

In certain cases, the connection for the flow of cooling fluid between the engine which has to be cooled and the heat exchanger may be established in an exceptionally simple manner without resorting to shaft seals. The impeller which circulates the cooling fluid may be accommodated in a space between the heat exchanger and the engine so that it requires no additional space.

The rotor of the heat exchanger may be connected with the rotary housing of the engine or with the rotating shaft of the engine. In both instances, the rotor of the heat exchanger rotates with that rotary part of the engine with which it is connected. Such rotary movement of the rotor causes a current of air to flow transversely through the heat exchanger. Instead of using an impeller or a positive displacement pump, the cooling fluid may be circulated in response to relative rotation of certain parts. The centrifugal force in the system of tubes which connect the engine to the hollow blades of the heat exchanger may be used for this purpose.

The extent of cooling is regulated by throttling the flow of air through the heat exchanger so that the temperature of the cooling fluid remains constant. If desired, the piston and the cylinder of the engine may be cooled by separate streams of a cooling medium. For example, the cylinder may be cooled by air and the piston may be cooled by oil.

The invention will be described in greater detail with reference to the accompanying drawings, in which:

FIG. 5 is an axial section through a modified power plant;

FIG. 6 is a fragmentary section as seen in the direction of arrows from the line VI—VI of FIG. 5;

FIG. 7 is a fragmentary section as seen in the direction of arrows from the line VII—VII of FIG. 5;

Figure 1:
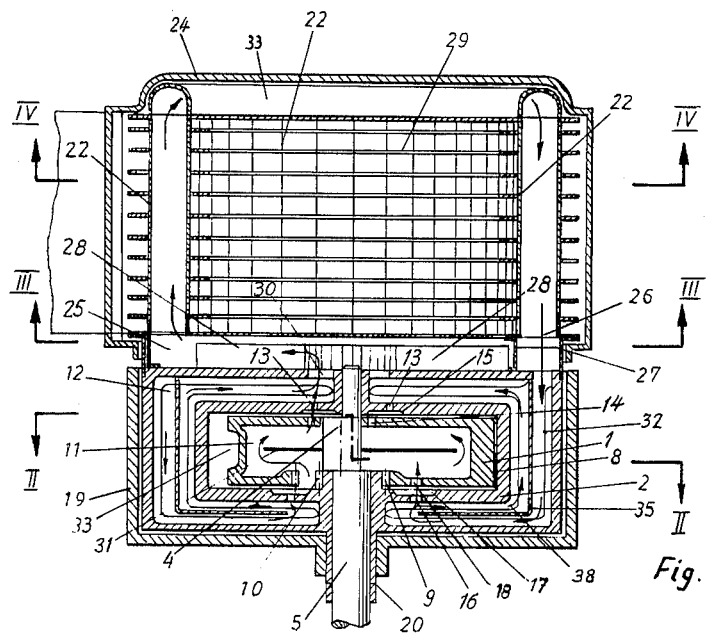
FIG. 1 is an axial section through a power plant which embodies one form of the invention.

The power plant shown in FIGS. 1 to 4 comprises a rotary-piston engine having a piston 1 and a cylinder 2. The piston 1 and cylinder 2 define between themselves a combustion chamber 3. When the piston 1 rotates about the cam 4 of a fixed shaft 5, the combustion chamber 3 carries out a rotary movement because the edges 6, 7 and 8 of the piston 1 are always in contact with the internal surface of the cylinder 2. The operation of the engine is known and need not be described here. For the same reason and for the sake of clarity, the ignition system and the conduits for supplying fuel and for removing products of combustion are not shown in FIGS. 1–4.

That end of the piston which is remote from its bearing on the cam 4 is provided with a circular aperture surrounded by an internal gear 9 which meshes with the gear 10. The piston 1 is hollow and defines a cavity 11 for the cooling fluid. The cylinder 2 also has a cavity 12 for the cooling fluid. The cavities 11 and 12 communicate with each other through a ring of apertures or perforations 13 provided in a flat end wall of the cylinder, this ring of apertures 13 being located opposite a ring of apertures 14 in the adjacent end wall of the piston 1. Between these two sets of apertures 13 and 14, an annular groove 15 is provided in the cylinder so that there is permanent communication between the apertures 13 and 14 by way of the annular groove 15 regardless of the momentary angular position of the piston 1.

A similarly formed path for the flow of cooling fluid is provided at the opposite end of the cylinder 2 and consists of a ring of apertures or perforations 16 in the cylinder, an annular groove 17 in the cylinder, and a ring of apertures 18 in the piston 1.

A fixed housing 19 surrounds the cylinder 2. The shaft 5 carries the gear 10 which is driven by the piston 1. The cylinder 2 rotates in the opposite sense and imparts a moment of rotation through a tubular stub shaft 20 which surrounds the shaft 5. The rotary heat exchanger which functions at the same time as the rotor of a cross-flow fan for conveying a cooling air is arranged on the rotating cylinder 2 and is located at that end which is remote from the driven end of the cylinder.

Figure 2:
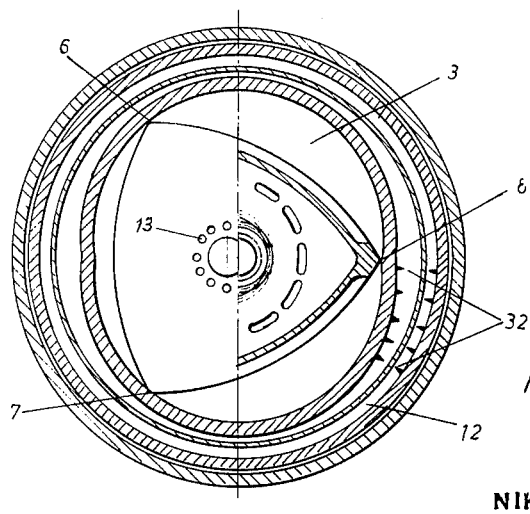
FIG. 2 is a section as seen in the direction of arrows from the line II—II of FIG. 1.
Figure 4:
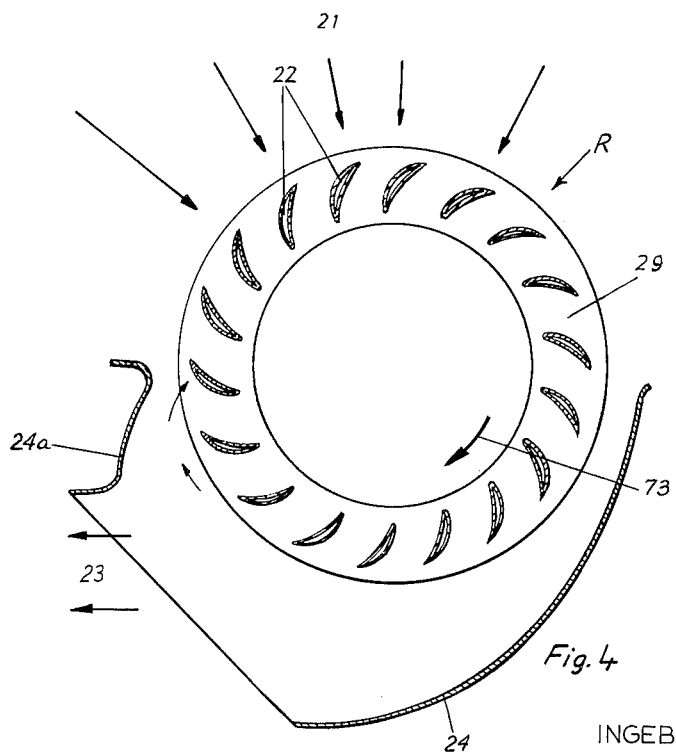
FIG. 4 is a section as seen in the direction of arrows from the line IV—IV of FIG. 1.

FIG. 4 shows the fixed fan elements which are illustrated in section in FIG. 2. Arrows shown in FIG. 4 indicate the direction in which the cooling air flows through the heat exchanger. The fan is a cross-flow fan in which the cooling air is conveyed through a cylindrical rotor R. This rotor comprises a ring of blades 22 arranged parallel to the rotor axis, with their outer edges leading in a direction of intended rotation shown by the arrow 173. The cooling air enters the rotor R at 21 and, after having been deflected inside the rotor in the plane of FIG. 4, it leaves the blades at 23. A guide wall 24a which extends over the full length of the rotor R forms part of a casing 24. In the preferred type of our cross-flow fan, the rotor R cooperates with the guide wall 24 to set up a cylindrical vortex which is eccentric to the rotor axis and which has a core region penetrating the blades 22 in a zone adjacent to the wall 24a. The vortex guides the current of air through the rotor R in a curved path. For further information regarding the design and construction of the rotor R, the reader is referred to British Patent No. 876,611.

If desired, the heat exchanger may be constructed to operate as a cross-flow fan in some other way, or as a centrifugal or radial fan, i.e., a fan in which a current of air is sucked in the axial direction at the open end of the rotor and is blown out with a radial component over the whole circumference of the rotor. In such heat exchangers, the rotor may be constructed as shown in FIG. 1, but the casing 24 will be provided with an open end.

Figure 3:
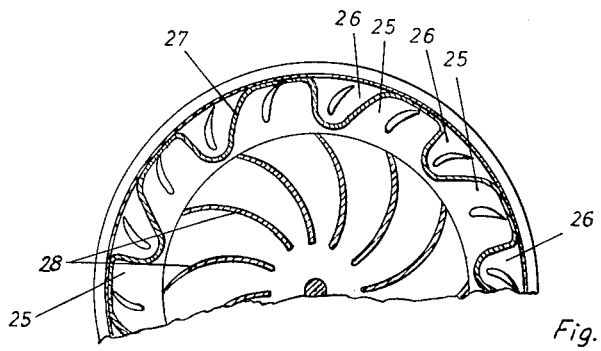
FIG. 3 is a fragmentary section as seen in the direction of arrows from the line III—III of FIG. 1.

The blades 22 of the heat exchanger are hollow and, as shown in FIG. 3, each second blade communicates with a chamber 25 which accommodates vanes 28 operating as a rotary pump and being driven by the piston 1. The remaining blades 22 communicate with a space 26 which is separated from the chamber 25 by a circumferentially arranged undulate partition or wall 27. At their ends which are remote from the engine, the blades 22 communicate with each other through an annular duct 33.

The cavity 12 of the cylinder 2 is subdivided by an annular partition 35. The space at the outer side of the partition 35 communicates with the space 26 through openings shown in FIG. 1, and the partition 35 extends as far as the ring of apertures 16 where the cooling fluid is divided into two streams. One stream enters the cylinder 2 through the apertures 16 and flows through the cavity 12 to pass through the apertures 13, 14 and through apertures 30 of the cylinder 2 into the space containing the blades 28. This stream then flows through such blades 22 which communicate with the chamber 25. The other stream of cooling fluid flows in the direction indicated by arrows 38, i.e., around the cylinder 2, and passes through the apertures 30 into the space in which the vanes 28 are situated.

Flat rings or ribs 29 are arranged at axially spaced intervals along the length of the rotor R and are coaxial therewith. These rings exchange heat with the blades 22 so as to enlarge the total surface area available for heat exchange.

The power plant of FIGS. 1 to 4 operates as follows:

The cylinder 2 drives the rotor R including the blades 22 and the cooling rings 29. Such rotation results in flow of cooling air through the heat exchanger, and the air cools the fluid (e.g., oil) which, in this embodiment, fills the interior of the blades 22, the ducts 33, the chamber 25, the space 26 and the cavities 11 and 12 to circulate in the above described manner.

The cavity 11 of the piston 1 accommodates a disc-shaped partition 31 which prevents direct flow of cooling fluid from the perforations 18 to the perforations 14. The numerals 32 denote fins or ribs provided on the piston 1 and cylinder 2 to improve the exchange of heat with the cooling fluid.

FIGS. 5 and 6 show a second power plant which differentiates from the power plant of FIG. 1 in that it includes a different rotary-piston engine. In FIG. 5, the driven shaft of the engine is indicated by the reference numeral 50. A piston 52 is rotatable on a cam 51 which is rigid with the driven shaft 50. A cylinder 53 is arranged in fixed position around the piston 52 and the cylinder and piston define between themselves a combustion chamber 54. An oscillating mass 55 is secured to an extension of the shaft 50 to compensate for the eccentricity of the piston 52. A cylindrical pump rotor 56 is also mounted on the shaft 50.

The heat exchanger comprises a series of hollow cooling ribs 58 and is coaxially secured to the shaft 50 in overhung position. Each of the cooling ribs 58 comprises a pair of dished rings 58a, 58b which are mirror symmetrical with reference to each other and carry integral axially extending projections 59, 59a. The free ends of the projections 59, 59a are sealingly connected to each other so that such projections together form fan blades 60, 62 serving to induce the flow of a current of cooling air. The other elements of the fan have been omitted for the sake of clarity, but it is to be understood that they are constructed and arranged as described with reference to FIG. 4. The heat exchanger of FIG. 5 differentiates from that of FIG. 4 in that the ribs 58 are hollow so that a larger effective surface is available for exchange of heat. For the sake of clarity, only six hollow ribs 58 are shown in FIG. 5. However, the wall thicknesses of the ribs 58 may be only ⅕ mm. and the distance between adjoining ribs may be only 2 mm. so that the number of ribs in a heat exchanger may be 20 or even 200.

As shown in FIG. 5, the heat exchanger has alternate blades 60 connected with an annular space 61. The remaining blades 62 communicate with an annular space 63. The cooling fluid flows from the blades 60 through the hollow ribs 58 and into the blades 62. Constrictions 64 projecting into the interior of the ribs 58 are provided between the blades 60 and 62 to insure a more uniform flow between adjacent blades.

The constrictions 64 between the annular spaces 61 and 63 are constructed to have an eccentrically distributed mass, like the oscillating mass 55.

The cooling fluid, e.g. oil, circulates as follows: Excess pressure is produced in a space 65 defined by the twin-walled cylinder 53 by means of the pump rotor 56. This causes the cooling fluid to flow in the direction indicated by arrows 66 around the cylinder 53 whence the fluid passes through a ring of apertures or perforations 67 and into the hollow eccentric cam 51. The greater part of the cooling fluid flows in the direction indicated by the arrow 69; a smaller part passes through a ring of perforations 70 and into the interior of the piston 52 whence it can pass through a ring of perforations 71 to lubricate the contacting surfaces of the piston and cylinder. Cooling fluid flowing through the piston 52 passes around a deflecting disc 72 which is located in a plane extending at right angles to the axis of rotation. From there, the cooling fluid returns through a ring of perforations 73 and flows into the hollow cam 51. The cooling fluid then passes through a ring of perforations 68 and enters the annular space 63 to flow into the blades 62. As described above, the fluid then flows into the blades 60 and accumulates in the annular space 61 to return to the pump rotor 56, a part of the fluid flowing through a ring of perforations 74. A shaft seal 75 is arranged between the fixed cylinder 53 and the rotating heat exchanger.

FIGS. 6 and 7 are transverse sections taken along the lines VI—VI and VII—VII of FIG. 5. The reference numerals used in FIGS. 6 and 7 correspond to those used in FIG. 5.

Figure 8:
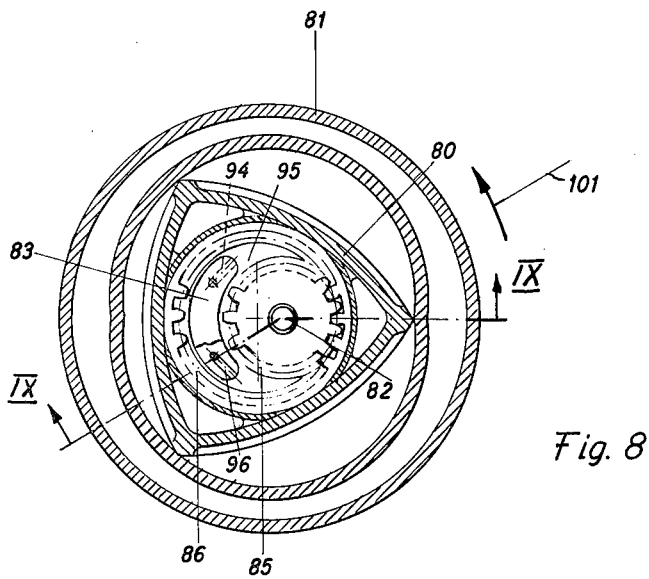
FIG. 8 is a transverse section through the engine of a third power plant wherein the means for circulating the cooling fluid comprises a gear wheel pump.

Whereas in the previously described power plants the cooling fluid is conveyed by means of centrifugal pumps, a positive-displacement pump is used for this purpose in the power plant shown in FIG. 8. This positive-displacement pump is constructed as an internally toothed gear pump. In accordance with the invention, the internal gear 86 of a piston 80 constitutes the rotary gear of a pair of gears the other of which is formed as a spur gear 85 mounted on a shaft 82. A sickle-shaped valve element 83 is provided with an inflow duct 94 and an outflow duct 96, both arranged opposite the point of engagement of the gears 85, 86.

Figure 9:
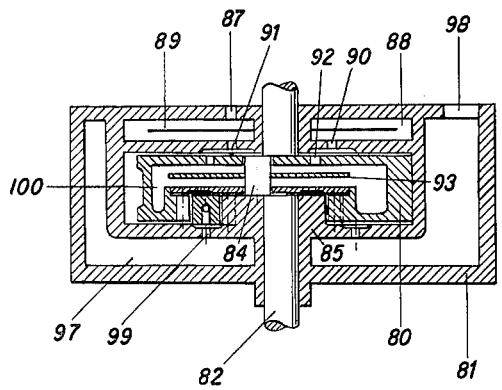
FIG. 9 is a section as seen in the direction of arrows from the line IX—IX of FIG. 8.

FIG. 9 is a section taken along the line IX—IX of FIG. 8. Corresponding parts are indicated by the same reference numerals as in FIG. 8. The gears 85, 86 forming the gear wheel pump are covered by the valve element 83. This valve element is rigidly connected with a cam 84 on the shaft 82.

The circulation of cooling fluid (e.g., oil) is as follows: The fluid passes from the rotary heat exchanger, not shown in FIGS. 8 and 9, through a ring of apertures or perforations 87 provided in a twin-walled cylinder 81 and into an annular space 88 which contains a partition 89. The fluid then passes through a ring of perforations 90 into a groove 91 and from there through a ring of perforations 92 into the internal space 100 of the piston 80. From there, the fluid flows around a partition 93 and passes through the inflow duct 94 of the valve element 83 into a chamber 95 between the gears 85, 86. The fluid flows between the teeth of these gears to the outflow duct 96 and is conveyed through a ring of perforations 99 into the hollow jacket 97 of the cylinder 81 and then flows through the opening 98 into the rotating heat exchanger. The heat exchanger is driven by the shaft 82, and the arrow 101 indicates the direction of rotation of the piston 80.

What is claimed is:

1. A power plant comprising a rotary-piston engine having a housing, a cylinder member formed in said housing, a piston member rotatably mounted in said cylinder member, at least one of said members being rotatably journaled in said housing for rotation about an axis and at least one of said members being formed with a passage for circulation of a cooling fluid therethrough in heat-exchanging relationship with the respective member; and a cross-flow heat exchanger axially offset from said members, said heat exchanger comprising a rotor operatively coupled with a rotating one of said members and provided with a plurality of axially extending angularly spaced blades forming a generally cylindrical cage; means for feeding said cooling fluid through said blades, casing means enclosing said cage and provided with an air inlet and an air outlet while co-operating with said cage to produce an eccentric vortex region inducing air through said cage from said inlet to said outlet generally transversely to the axis of rotation thereof.

2. A power plant comprising a rotary-piston engine having a housing, a cylinder member formed in said housing, a piston member rotatably mounted on said cylinder member, at least one of said members being rotatably journaled in said housing for rotation about an axis and at least one of said members being formed with a passage for circulation of a cooling fluid therethrough in heat-exchanging relationship with the respective member; and a cross-flow heat exchanger axially offset from said members, said heat exchanger comprising a rotor operatively coupled with a rotating one of said members and provided with a plurality of axially extending angularly spaced blades forming a generally cylindrical cage, said blades being forwardly curved in the direction of rotation of said cage; means for feeding said cooling fluid through said blades, casing means enclosing said cage and provided with an air inlet and an air outlet while co-operating with said cage to produce an eccentric vortex region inducing air through said cage from said inlet to said outlet generally transversely to the axis of rotation thereof.

3. A power plant comprising a rotary-piston engine having a housing, a cylinder member formed in said housing, a piston member rotatably mounted in said cylinder member, at least one of said members being rotatably journaled in said housing for rotation about an axis and at least one of said members being formed with a passage for circulation of a cooling fluid therethrough in heat-exchanging relationship with the respective member; and a cross-flow heat exchanger axially offset from said members, said heat exchanger comprising a rotor operatively coupled with a rotating one of said members and provided with a plurality of axially extending angularly spaced blades forming a generally cylindrical cage, said blades being forwardly curved in the direction of rotation of said cage; means for feeding said cooling fluid axially through said blades alternately in opposite directions, casing means enclosing said cage and provided with an air inlet and an air outlet while cooperating with said cage to produce an eccentric vortex region inducing air through said cage from said inlet to said outlet generally transversely to the axis of rotation thereof.

4. A power plant comprising a rotary-piston engine having a housing, a cylinder member formed in said housing, a piston member rotatably mounted in said cylinder member, at least one of said members being rotatably journaled in said housing for rotation about an axis and at least one of said members being formed with a passage for circulation of a cooling fluid therethrough in heat-exchanging relationship with the respective member; and a cross-flow heat exchanger axially offset from said members, said heat exchanger comprising a rotor operatively coupled with a rotating one of said members and provided with a plurality of axially extending angularly spaced blades forming a generally cylindrical cage, said blades being forwardly curved in the direction of rotation of said cage, pump means connected with said rotating members for feeding said cooling fluid axially through said blades alternately in opposite directions, casing means enclosing said cage and provided with an air inlet and an air outlet while cooperating with said cage to produce an eccentric vortex region inducing air through said cage from said inlet to said outlet generally transversely to the axis of rotation thereof.

5. A power plant comprising a rotary-piston engine having a housing, a cylinder member formed in said housing, a piston member rotatably mounted in said cylinder member, at least one of said members being rotatably journaled in said housing for rotation about an axis and at least one of said members being formed with a passage for circulation of a cooling fluid therethrough in heat-exchanging relationship with the respective member; and a cross-flow heat exchanger axially offset from said members, said heat exchanger comprising a rotor operatively coupled with a rotating one of said members and provided with a plurality of axially extending angularly spaced blades forming a generally cylindrical cage, said blades being forwardly curved in the direction of rotation of said cage, pump means connected with said rotating members for feeding said cooling fluid axially through said blades alternately in opposite directions, casing means enclosing said cage and provided with an air inlet and an air outlet while cooperating with said cage to produce an eccentric vortex region inducing air through said cage from said inlet to said outlet generally transversely to the axis of rotation thereof, said pump means including a positive displacement pump having an internally toothed gear wheel mounted on the rotating member and an externally toothed gear wheel mounted on said shaft for transmitting thereto a moment of rotation of said rotary member.

References Cited by the Examiner

UNITED STATES PATENTS

| | | | |
|---|---|---|---|
| 947,424 | 1/1910 | Weber | 123—41.43 |
| 2,746,434 | 5/1956 | Swenson | 123—41.43 |

FOREIGN PATENTS

| | | |
|---|---|---|
| 616,332 | 10/1926 | France. |
| 322,812 | 7/1920 | Germany. |

SAMUEL LEVINE, *Primary Examiner*.

RICHARD B. WILKINSON, *Examiner*.